United States Patent
Isberg et al.

(10) Patent No.: US 9,646,360 B2
(45) Date of Patent: May 9, 2017

(54) PROCESSING DIGITAL PHOTOGRAPHS IN RESPONSE TO EXTERNAL APPLICATIONS

(71) Applicant: Sony Corporation, Tokyo (JP)

(72) Inventors: Peter Isberg, Lund (SE); Pär-Anders Aronsson, Malmö (SE); Ola Thörn, Limhamn (SE); Olivier Moliner, Lund (SE); Håkan Jonsson, Malmö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 89 days.

(21) Appl. No.: 14/441,567

(22) PCT Filed: Apr. 25, 2014

(86) PCT No.: PCT/JP2014/002342
§ 371 (c)(1),
(2) Date: May 8, 2015

(87) PCT Pub. No.: WO2015/162647
PCT Pub. Date: Oct. 29, 2015

(65) Prior Publication Data
US 2016/0048943 A1    Feb. 18, 2016

(51) Int. Cl.
| | | |
|---|---|---|
| G06K 9/36 | (2006.01) |
| G06T 3/00 | (2006.01) |
| H04L 12/58 | (2006.01) |
| G06T 5/00 | (2006.01) |
| G06T 11/60 | (2006.01) |
| G06Q 50/00 | (2012.01) |
| H04N 5/262 | (2006.01) |

(52) U.S. Cl.
CPC .......... G06T 3/0056 (2013.01); G06Q 50/01 (2013.01); G06T 5/00 (2013.01); G06T 11/60 (2013.01); H04L 51/32 (2013.01); H04N 5/262 (2013.01)

(58) Field of Classification Search
CPC ....... G06Q 50/01; G06T 11/60; G06T 3/0056; G06T 5/00; H04L 51/32; H04N 5/262
See application file for complete search history.

(56) References Cited

U.S. PATENT DOCUMENTS

| | | |
|---|---|---|
| 8,468,164 B1 | 6/2013 | Paleja et al. |
| 2010/0248741 A1 | 9/2010 | Setlur et al. |
| 2011/0004831 A1* | 1/2011 | Steinberg ............. H04N 21/454 715/753 |

(Continued)

FOREIGN PATENT DOCUMENTS

EP    2 536 120 A1    12/2012

OTHER PUBLICATIONS

Notification of Transmittal of the International Search Report and Written Opinion of the International Searching Authority, PCT Application No. PCT/JP2014/002342, Apr. 25, 2015.

*Primary Examiner* — Phuoc Tran
(74) *Attorney, Agent, or Firm* — Myers Bigel, P.A.

(57) ABSTRACT

A digital photograph is processed by receiving a communication related to the digital photograph from an application external to an image storage device that stores the digital photograph. Parameters related to the application are processed. The digital photograph is changed based on the parameters related to the application. Related methods, devices, and/or computer program products are described.

10 Claims, 11 Drawing Sheets

(56) References Cited

U.S. PATENT DOCUMENTS

| | | | |
|---|---|---|---|
| 2012/0301023 A1 | 11/2012 | Braun et al. | |
| 2012/0321131 A1* | 12/2012 | Kobayashi | H04N 1/00183 |
| | | | 382/103 |
| 2013/0066885 A1 | 3/2013 | Komuves | |
| 2013/0073976 A1* | 3/2013 | McDonald | G06Q 10/00 |
| | | | 715/739 |
| 2014/0040772 A1 | 2/2014 | Murata | |
| 2015/0178283 A1* | 6/2015 | Garg | G06F 17/3053 |
| | | | 707/748 |

* cited by examiner

PROCESSING DIGITAL PHOTOGRAPHS IN RESPONSE TO EXTERNAL APPLICATIONS

CROSS REFERENCE TO RELATED APPLICATION

This application is a 35 U.S.C. §371 national stage application of PCT International Application No. PCT/JP2014/002342, filed on 25 Apr. 2014, the disclosure and content of which is incorporated by reference herein in its entirety.

TECHNICAL FIELD

Various embodiments described herein relate to processing a digital photograph.

BACKGROUND ART

The ubiquitous presence of digital cameras has increased the use of digital photographs. Applications such as social media networks have improved the ease of sharing digital photographs. In many cases, users wish to improve or change the digital photographs, for example, by applying a filter to the photograph, before sharing via social media networks. Users of digital photographs are demanding ease of changing the digital photographs before sharing on social media networks.

The approaches described in this section could be pursued, but are not necessarily approaches that have been previously conceived or pursued. Therefore, unless otherwise indicated herein, the approaches described in this section are not prior art to claims in this application and any application claiming priority from this application, and are not admitted to be prior art by inclusion of this section.

SUMMARY

According to various embodiments described herein, processing a digital photograph may include receiving a communication related to the digital photograph from an application external to an image storage device that stores the digital photograph. Parameters related to the application from which the communication was received may be processed. The digital photograph may be changed based on the parameters related to the application.

In some embodiments, receiving a communication from the application may include receiving an SMS message, an email message and/or an application specific communication. Processing parameters related to the application may include parsing the communication to determine the linguistic expression in the communication. The linguistic expression may be a statement or question.

According to some embodiments, changing the digital photograph based on the parameters related to the application may include selecting a filter to apply to the digital photograph based on the linguistic expression in the communication.

In some embodiments, the application may be a social media application. Processing parameters related to the application may include determining one or more photographic filters that are trending on the newsfeed in the social media application. One or more of the photographic filters that are trending on the newsfeed may be selected. Changing the digital photograph may include applying one of the photographic filters that was selected to the digital photograph.

According to some embodiments, processing parameters related to the application may include determining one or more photographic filters that receive positive feedback in the social media application. One of the photographic filters that receive positive feedback may be selected. Changing the digital photograph may include applying the selected photographic filter to the digital photograph.

In some embodiments, processing parameters related to the application may include determining one or more photographic filters preferred by one or more contacts from the social media application. One of the photographic filters preferred by one or more social media contacts may be selected. Changing the digital photograph may include applying one of the photographic filters that was selected to the digital photograph. Selecting one of the one or more photographic filters may include suggesting photographic filters preferred by one or more contacts. An indication may be received that indicates a selected photographic filter, out of the photographic filters that were suggested, to apply to the digital photograph.

According to some embodiments, processing parameters related to the application may include selecting a time window that is different from the current time window. A type of photographic filter that is trending on the newsfeed of the social media application in the selected time window may be determined. The type of photographic filter that is trending in the selected time window may be indicated.

In some embodiments, selecting a time window may include selecting two or more time windows. Determining the type of photographic filter may include determining respective types of photographic filters that are trending on the newsfeed in the social media application in respective ones of the two or more time windows.

According to some embodiments, changing the digital photograph may include automatically applying one or more filters to the digital photograph based on the processing of parameters related to the application.

In some embodiments, changing the digital photograph based on parameters related to the application may include suggesting one or more photographic filters to apply to the digital photograph based on the processing of parameters related to the application. An indication of one of the one or more filters to apply to the digital photograph may be received. The one or more photographic filters that were indicated may be applied to the digital photograph.

According to some embodiments, changing the digital photograph based on parameters related to the application may include providing tactile feedback to the user based on parameters related to the application. The tactile feedback may indicate one or more suggested changes to parameters related to the digital photograph. An indication may be received from the user that includes one of the suggested changes to parameters related to the digital photograph. A photographic filter may be applied to the digital photograph based on the indication.

It will be understood that various embodiments were described above in terms of methods of processing a digital photograph. Analogous embodiments may be provided for a device, such as a camera, according to any of the embodiments described herein. For example, a device may include a processor and an image processing system that runs on the processor and is configured to perform operations such as receiving a communication related to the digital photograph from an application external to an image storage device that stores the digital photograph, processing parameters related to the application from which the communication was received, and changing the digital photograph based on the parameters related to the application.

Analogous embodiments may also be provided for a computer program or a computer program product according to any of the embodiments described herein. For example, a computer program may include a tangible computer readable storage medium comprising computer readable program code embodied in the medium that when executed by at least one processor of a computer system causes the computer system to perform operations such as receiving a communication related to the digital photograph from an application external to an image storage device that stores the digital photograph, processing parameters related to the application from which the communication was received, and changing the digital photograph based on the parameters related to the application.

Other electronic devices, methods, and/or computer program products according to embodiments of the invention will be or become apparent to one with skill in the art upon review of the following drawings and detailed description. It is intended that all such additional electronic devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF DRAWINGS

The accompanying drawings, which are included to provide a further understanding of the invention and are incorporated in and constitute a part of this application, illustrate certain embodiment(s) of the invention. In the drawings.

DESCRIPTION OF EMBODIMENTS

Various embodiments described herein can provide systems, methods and devices for processing a digital photograph. Various embodiments described herein may be used, in particular with mobile devices such as mobile telephones or other internet-enabled devices.

Various embodiments will now be described more fully hereinafter with reference to the accompanying drawings, in which examples of various embodiments are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments are described herein in the context of operating in a mobile device. It will be understood, however, that the present invention is not limited to such embodiments and may be embodied generally in any type of internet-enabled device that may access digital photographs. As used herein, a digital photograph may include any representation of an image that is captured by a device such as a camera or other image capturing device. The image capturing device may record or save images for processing. In some embodiments, the device may not necessarily record or save the images but may capture and process the images or may forward the images to another device. The captured image may reside or be stored in any form of memory such as RAM, ROM, cache, disk, USB, or temporary memory. As described herein, processing a digital photograph may include accessing a digital photograph from any memory source that is co-located with the processing device, remote from the processing device, or in communication with the processing device.

Figure 1A:
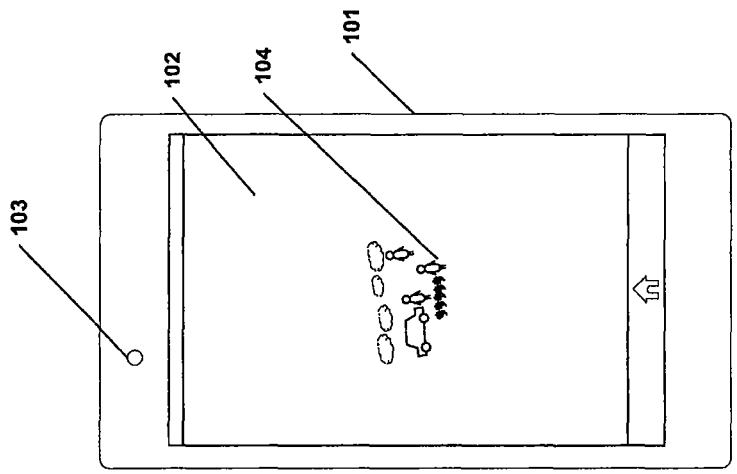
FIG. 1A is a simplified block diagram including a mobile device with a camera.

FIG. 1A is a simplified block diagram of a mobile device with a camera. As shown in FIG. 1A, a mobile device 101 may include a screen 102, and a camera 103. An image 104 may be captured by the camera and stored in the device. The image 104 may be stored in the device 101, stored remotely, or otherwise communicated to the device.

As used herein, a camera can include any device that receives image and/or scene data, and may include, but is not limited to, a mobile device ("cellular" telephone), laptop/portable computer, pocket computer, hand-held computer, desktop computer, a machine to machine (M2M) or MTC type device, a sensor with a communication interface, surveillance system sensor, standalone camera (point and shoot, single lens reflex (SLR), etc.), telescope, television cameras, etc. Moreover, the device may record or save the images for processing. In other embodiments, the device may not necessarily record or save the images but may capture and process the images and forward the processed images to another device. Examples of the camera could include single lens cameras, array cameras that include multiple sub-cameras arranged in various configurations, and/or light-field/plenoptic cameras. The camera may include stereo cameras which comprise two cameras. The camera may include wearable cameras, life log cameras, action cameras, and/or cameras in a watch. It will also be understood that the camera may include a processor, memory, and other resources appropriately scaled to accommodate the large amount of processing required to calculate and process depth maps as discussed herein.

Figure 1B:
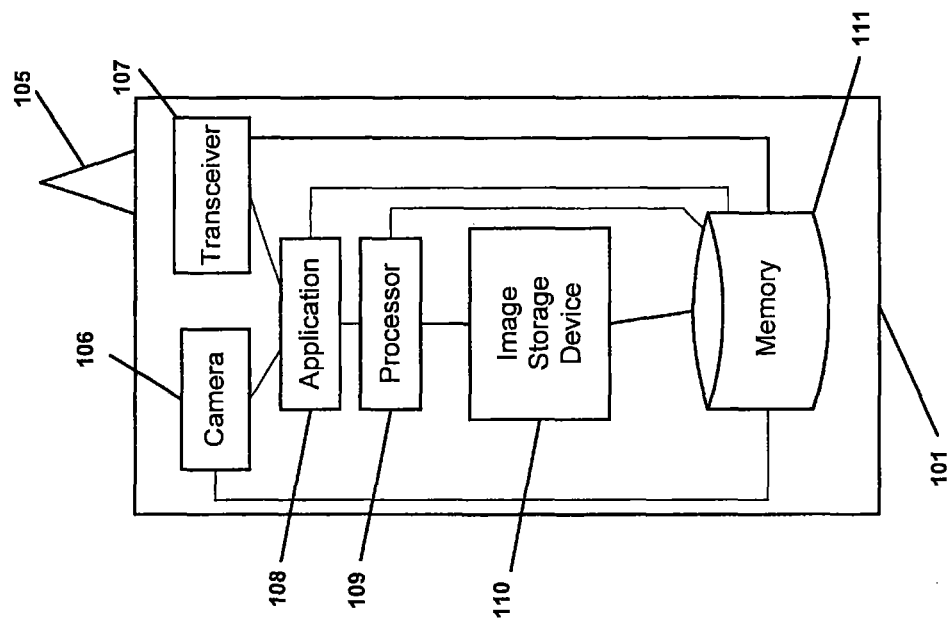
FIG. 1B is a simplified block diagram of a device interfacing to an image storage device, method and/or computer program product, according to various embodiments described herein.

FIG. 1B is a simplified block diagram of the device interfacing to an image storage device. FIG. 1B illustrates a mobile device 101 that includes a camera 106. The camera 106 may be inside the mobile device 101, outside the mobile device 101, or may remotely communicate with the mobile device 101. The mobile device 101 may interface with the camera 106 wirelessly and/or by a wireline connection. The camera 106 captures and may store an image. The image may be stored in an image storage device 110. In some embodiments, a memory 111 may include an image storage device 110. As shown in FIG. 1B, the example mobile device 101 may include a processor 109, a transceiver 107, and/or an antenna 105. An application 108 may be running on the mobile device 101. The application 108 may be running on a processor 109. The mobile device 101 may include an image storage device 110. The image storage device 110 may be coupled to the memory 111, the processor 109 and/or the application 108. In particular embodiments, some or all of the functionality described above as being provided by mobile devices may be provided by a processor 109 executing instructions stored on a computer readable medium such as a memory 111 shown in FIG. 1B. Alternative embodiments of the device may include additional components beyond those shown in FIG. 1B that may be responsible for providing certain aspects of the mobile device's functionality, including any of the functionality described above and/or any functionality necessary to support the solutions described above.

Figure 2:
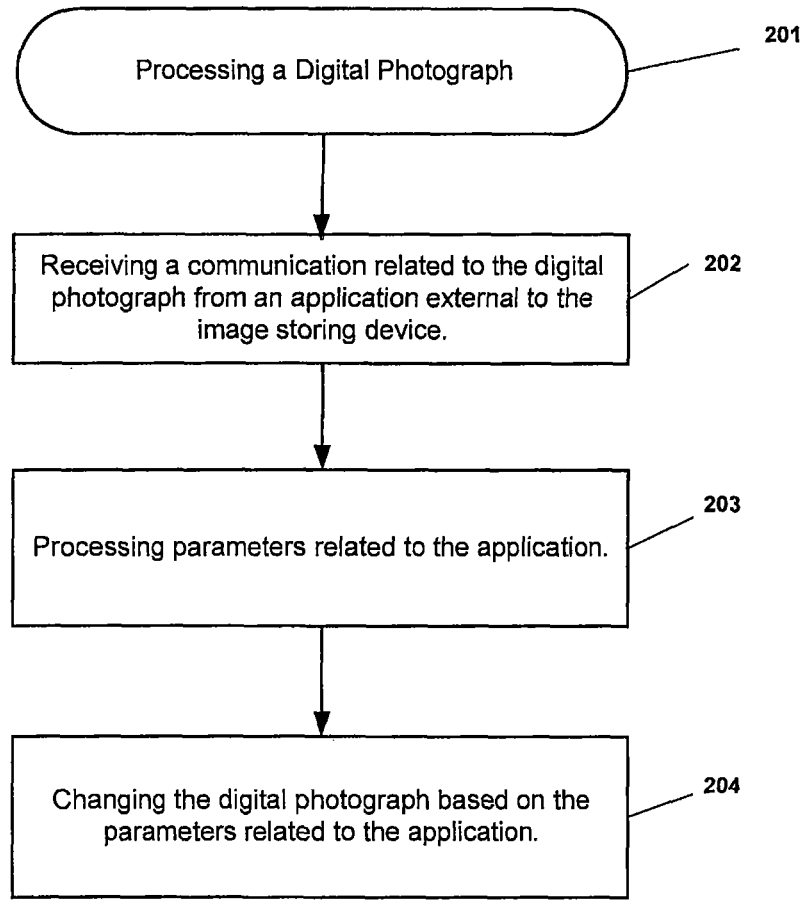
FIG. 2 is a flowchart of operations that may be performed to process a digital photograph by a system, method, device, and/or computer program product according to various embodiments described herein.

FIG. 2 is a flowchart of operations that may be performed to process a digital photograph by a system, method, device, and/or computer program product, according to various embodiments described herein. Referring to FIG. 2, a device that includes a memory and/or an image storage device may be operated at Block 201, which may be embodied, for example, as mobile device 101 in FIGS. 1A and 1B. At Block 202, a communication related to the digital photograph may be received from an application external to the image storage device. The image storage device may include any form of memory such as RAM, ROM, cache, disk, USB, memory card, and/or temporary memory. The application may be running on a processor located in the device, may be running external to the device, and/or be running remotely from the device. The application, for example, may include social media applications and/or photo sharing applications such as Facebook, Twitter, Tumblr, Hangouts, Loop, Vine, FaceTime, Tadaa SLR, and/or LinkedIn. The communication from the application may serve as a trigger for processing of a digital photograph. At Block 203, parameters related to the application are processed. Parameters related to the application may include information related to the application, application data, and/or application configuration. These parameters may include the type of photographs, types of processing applied to the photographs, photographic filters, user information, contacts of the present user, configuration information, etc. At Block 204, the digital photograph may be changed based on parameters related to the application, according to various embodiments described herein.

Figure 3:
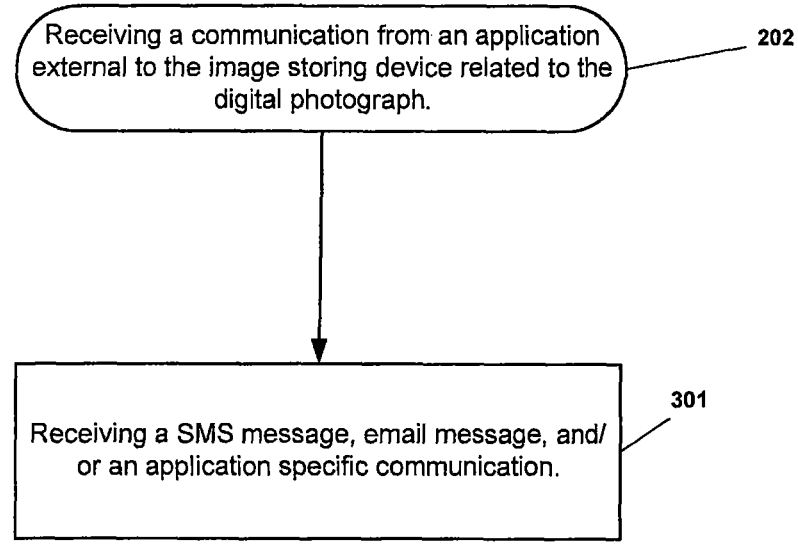
FIG. 3 is a flowchart of operations that may be performed to receive a communication related to the digital photograph from an external application by a system, method, device, and/or computer program product, according to various embodiments described herein.

FIG. 3 is a flowchart of operations that may be performed to receive the communication related to the digital photograph from an external application, which may correspond to Block 202 of FIG. 2. Referring to FIG. 3, at Block 301, an SMS message, an email message, and/or an application specific communication may be received. For example, an application specific communication may include a Facebook Messenger message. In some embodiments, communication from the external application may include any level of protocol communications including communications within or between the operating system, kernel, network layer, and/or application layer. For example, a Facebook Messenger message from the Facebook application may trigger sending of a digital photograph in response.

Figure 4:
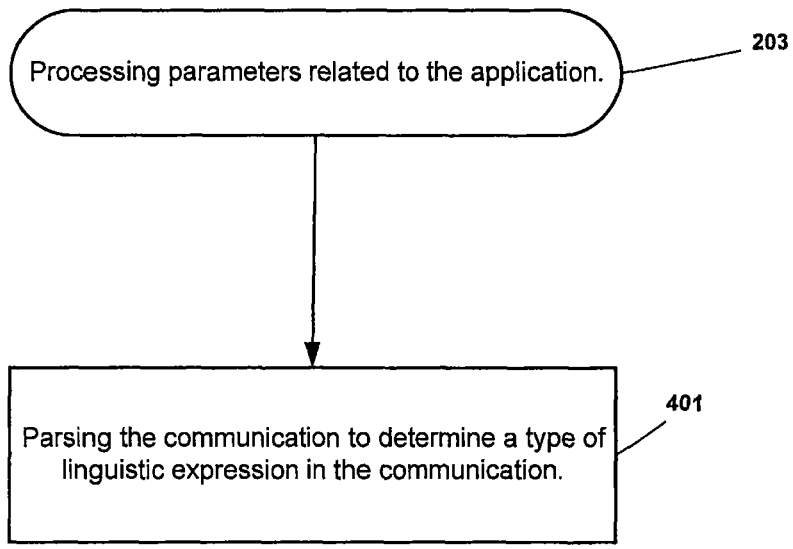
FIG. 4 is a flowchart of operations that may be performed to process parameters related to the application by a system, method, device, and/or computer program product, according to various embodiments described herein.

FIG. 4 is a flowchart of operations that may be performed to process parameters related to the application, which may correspond to Block 203 of FIG. 2. Referring to FIG. 4, at Block 401, the communication that is received may be parsed to determine a linguistic expression in the communication. The linguistic expression, according to some embodiments, may be parsed to determine specific content of the linguistic expression. In some embodiments, a type of the linguistic expression may be determined. Linguistic expressions may include questions, statements, commands, exclamations, pronouns, proper names, adverbs, and/or adjectives. The digital photograph may be created in response to the received communication or the digital photograph may be selected from existing digital photographs in response the communication.

Figure 5:
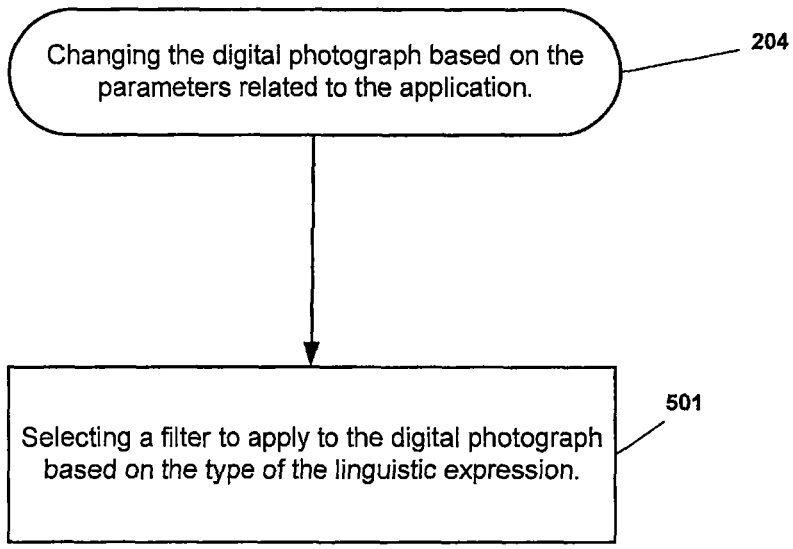
FIG. 5 is a flowchart of operations that may be performed to change the digital photograph by a system, method, device, and/or computer program product, according to various embodiments described herein.

FIG. 5 is a flowchart of operations that may be performed to change the digital photograph, which may correspond to Block 204 of FIG. 2. Referring to FIG. 5, at Block 501, a filter may be selected to apply to the digital photograph based on the linguistic expression. According to some embodiments, a photographic filter may be selected based on the content of the linguistic expression. For example, in response to a question "how are you doing today?", a digital filter may be applied that depicts a beach scene. In an another example, the statement "ha ha, you are a dog" may trigger use of a different photographic filter and/or different parameter changes when compared to the question "how is your dog?". Photographic filters may include any combination of changes that are applied to the digital photograph. For example, digital filters may include changes to composition, color harmony, color correction, ambient lighting, lightening or darkening, zooming, triggering of the flash, cropping, x-ray mode, blurring, highlighting, black-and-white, old-fashioned, EXIF data (exposure, aperture, etc), golden ratio cropping, configuration of capture rate, depth of field, HDR, and/or lens effects.

Figure 6:
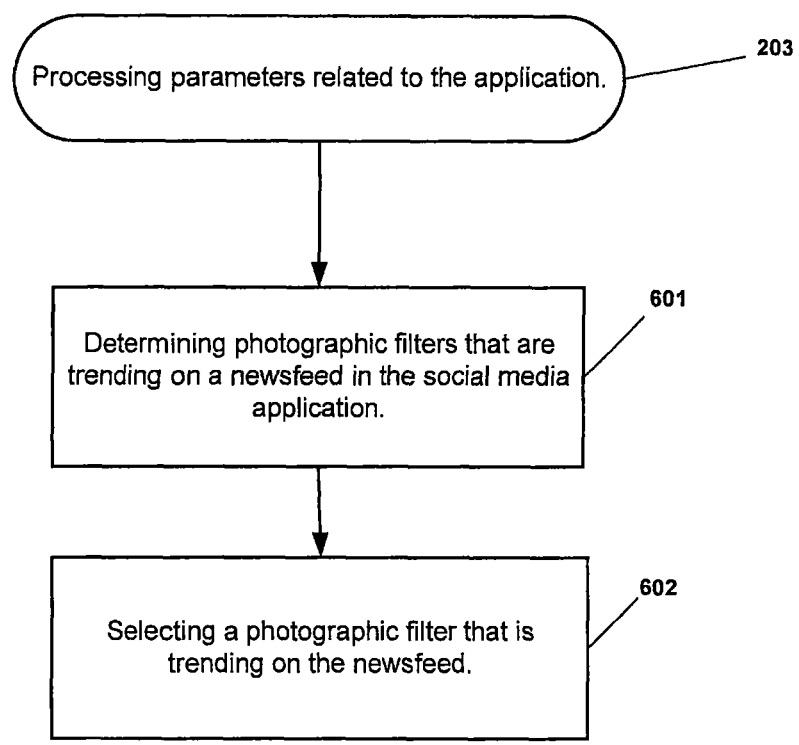
FIG. 6 is a flowchart of operations that may be performed to process parameters related to the application by a system, method, device, and/or computer program product, according to various embodiments described herein.

FIG. 6 is a flowchart of operations that may be performed to process parameters related to the application, which may correspond to Block 203 of FIG. 2. Referring to FIG. 6, at Block 601, photographic filters that are trending on a newsfeed in the social media application, photographic filters that are popular and/or overused may be determined. The newsfeed in a social media application may include any information that is related to the specific user, contacts of the specific user, or groups affiliated with the user. Trending may include a statistical compilation based on items in the newsfeed of the social media application. Trending may be influenced by marketing information, weighting based on contacts and/or groups related to the user, advertisements, and/or games, movies, and television programs watched by the user, contacts and/or groups. Trending information may be determined at the device, within the application, external to the application, and/or remotely from the device. At Block 602, a photographic filter that is trending on the newsfeed may be selected.

Figure 7:
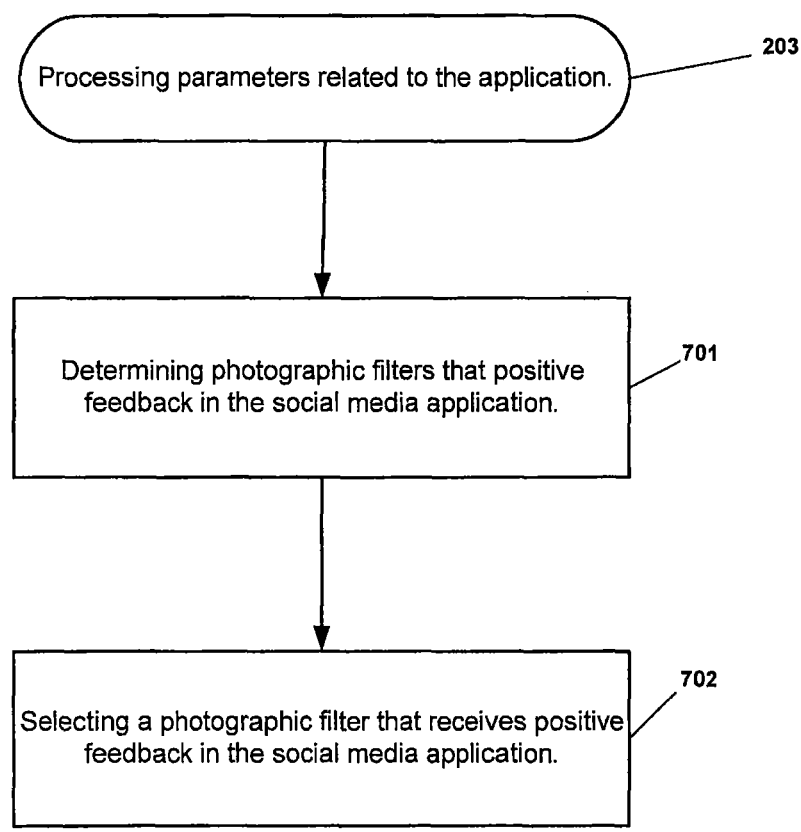
FIG. 7 is a flowchart of operations that may be performed to process parameters related to the application by a system, method, device, and/or computer program product, according to various embodiments described herein.

FIG. 7 is a flowchart of operations that may be performed to process parameters related to the application, which may correspond to Block 203 of FIG. 2. Referring to FIG. 7 at Block 701, photographic filters that have positive feedback in a social media application may be determined. For example, positive feedback may include a high incidence of "like" indications in applications such as Facebook, comments in relation to the photograph, number of views of the photograph, and any responses by users to a photograph. The comments in relation to the photographs may be tallied to indicate a type of response such as a positive response or the comments may be parsed to determine the content of the comments in relation to the response to a photograph. According to some embodiments, negative feedback may be determined and used similarly as described above with respect to positive feedback. Certain types of photographic filters may be used in response to negative feedback. Certain types of photographic filters may be designated for use based on comments by specific users on a white list and/or a blacklist of users that are preferred and/or blocked. At Block 702, a photographic filter that receives positive feedback in the social media application may be selected.

Figure 8:
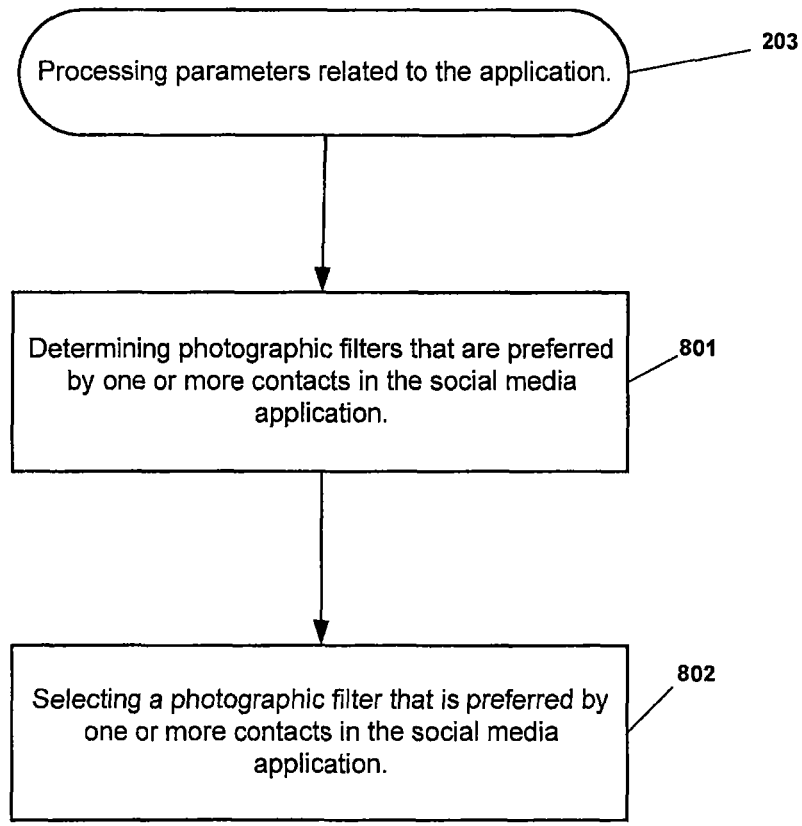
FIG. 8 is a flowchart of operations that may be performed to process parameters related to the application by a system, method, device, and/or computer program product, according to various embodiments described herein.

FIG. 8 is a flowchart of operations that may be performed to process parameters related to the application, which may correspond to Block 203 of FIG. 2. Referring to FIG. 8, at Block 801, photographic filters that are preferred by one or more contacts in the social media application may be determined. Contacts may include connections to the given user, friends of the given user, other users that are indicated to be followed/following by the given user, or other groups or users of interest as indicated by the user. At Block 802, a photographic filter that is preferred by one or more contacts in the social media application is selected. Certain contacts may be designated as to have a higher weighting when selecting the photographic filter. In some embodiments, specifics types of filters may be given a higher weighting when selecting the photographic filter.

Figure 9:
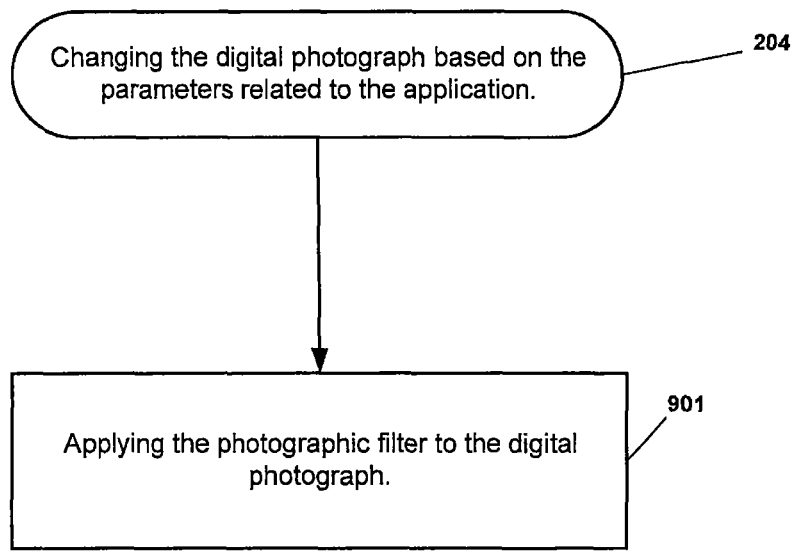
FIG. 9 is a flowchart of operations that may be performed to change the digital photograph by a system, method, device, and/or computer program product, according to various embodiments described herein.

FIG. 9 is a flowchart of operations that may be performed to change the digital photograph, which may correspond to Block 204 of FIG. 2. Referring to FIG. 9, at Block 901, a photographic filter may be applied to the digital photograph. Applying the photographic filter, according to some embodiments, may generally refer to any processing of the digital photograph according to rules as specified by the photographic filter. Applying the photographic filter may include processing pixels or other altering of the information representing the digital photograph based on the photographic filter that is being applied.

Figure 10:
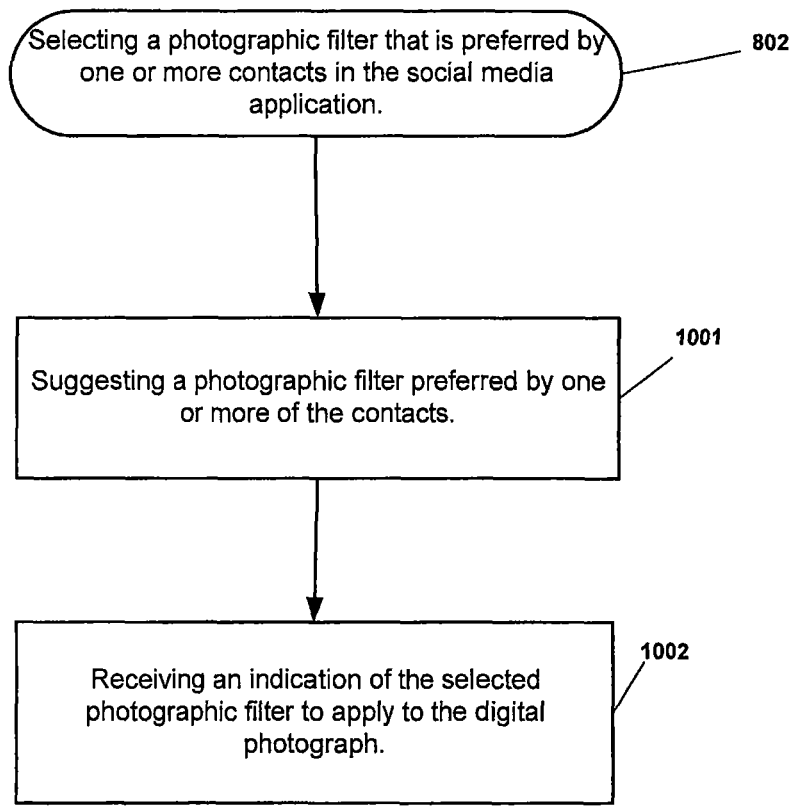
FIG. 10 is a flowchart of operations that may be performed to select a photographic filter that is preferred by a contact in the social media application by a system, method, device, and/or computer program product, according to various embodiments described herein.

FIG. 10 is a flowchart of operations that may be performed to select a photographic filtered that is preferred by a contact in the social media application, which may correspond to Block 802 of FIG. 8. Referring to FIG. 10, at Block 1001, a photographic filter preferred by one or more contacts may be suggested to the user. The suggestion may include a list of photographic filters and their related contacts, photographic filters that are preferred by a high incidence of contacts, and/or photographic filters that are weighted based on preference given to certain contacts. At Block 1002, an indication of the selected photographic filter to apply to the digital photograph may be received from the user. The indication may be a selection actively made by the user, or may be based on a profile or preferences set by the user.

Figure 11:
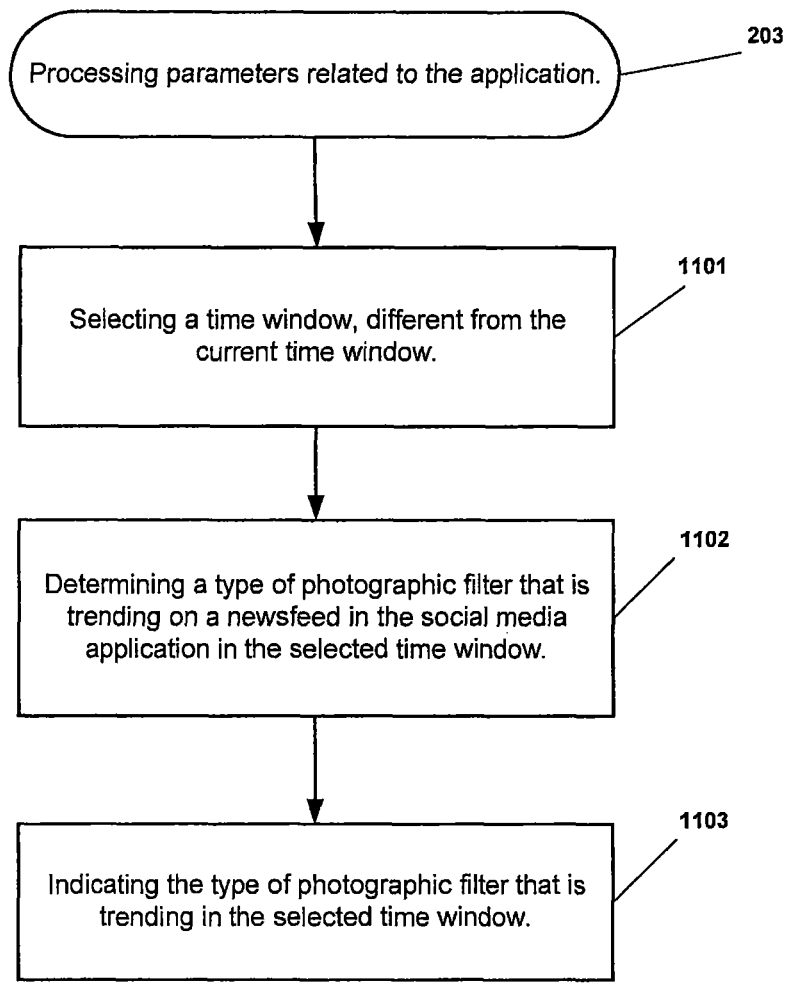
FIG. 11 is flowchart of operations that may be performed to process parameters related to the application by a system, method, device, and/or computer program product, according to various embodiments described herein.

FIG. 11 is a flowchart of operations that may be performed to process parameters related to the application, which may correspond to Block 203 of FIG. 2. Referring to FIG. 11, at Block 1101, a time window that is different from the current time window may be selected. The time window may be before the current time or at a time later than the current time. In some embodiments, a window including the current time may be used. At Block 1102, a type of photographic filter that is trending on the newsfeed in the social media application in the selected time window is determined. In some embodiments, specific contacts may be weighted differently for different time windows. At Block 1103, one or more types of photographic filters that are trending in the selected time window may be indicated.

Figure 12:
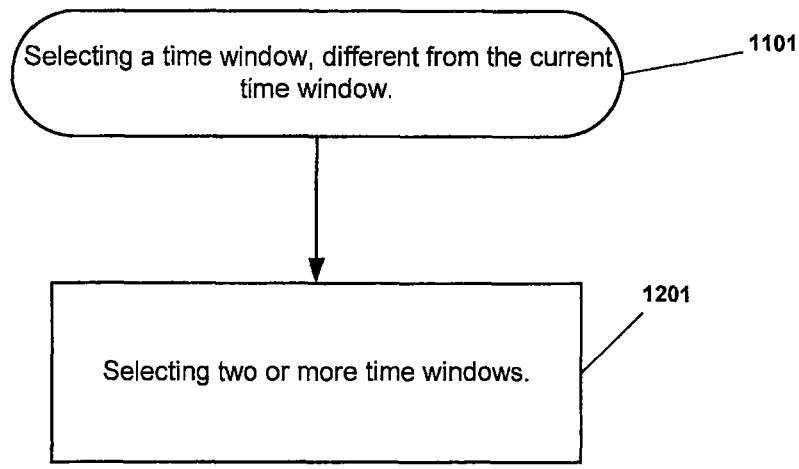
FIG. 12 is a flowchart of operations that may be performed to select a time window by a system, method, device, and/or computer program product, according to various embodiments described herein.

FIG. 12 is a flowchart of operations that may be performed to select a time window different from the current time window, which may correspond to Block 1101 of FIG. 11. Referring to FIG. 12, at Block 1201, two or more time windows may be selected. Types of photographic filters that are trending in the two or more time windows may be determined. Analysis may be conducted of the photographic filters trending in the two or more time windows to determine patterns and/or correlations between various time windows. Short-term and long-term trends of preferred photographic filters may be determined. Patterns, correlations, short-term trends and/or long-term trends may be indicated or suggested to the user.

Figure 13:
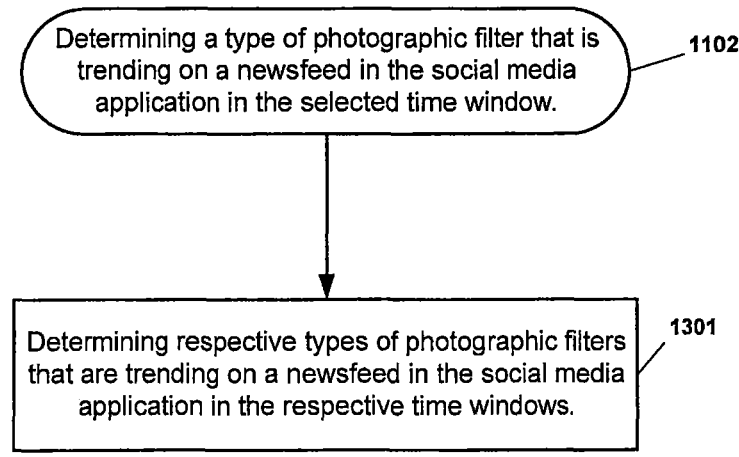
FIG. 13 is a flowchart of operations that may be performed to determine a type of photographic filter that is trending in the selected time window by a system, method, device, and/or computer program product, according to various embodiments described herein.

FIG. 13 is a flowchart of operations that may be performed to determine a type of photographic filter that is trending in the selected time window, which may correspond to Block 1102 of FIG. 11. Referring to FIG. 13, at Block 1301, respective types of photographic filters that are trending on the newsfeed of a social media application in the respective time windows may be determined. The photographic filters that are trending in the respective time windows may be indicated in a variety of ways such as a list, table, or a slider bar that may be adjusted to reflect various time windows. The time windows may be any level of granularity such as seconds, minutes, hours, days, weeks, months, years, decades, etc.

Figure 14:
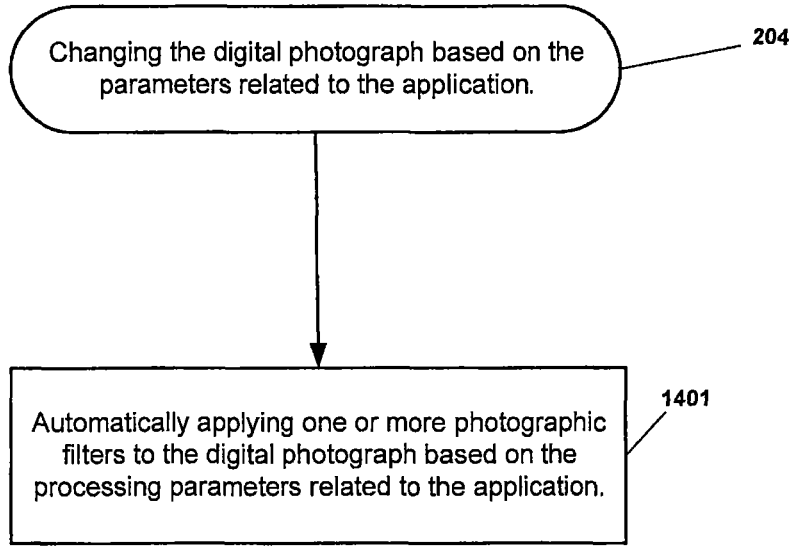
FIG. 14 is a flowchart of operations that may be performed to change the digital photograph by a system, method, device, and/or computer program product, according to various embodiments described herein.

FIG. 14 is a flowchart of operations that may be performed to change the digital photograph, which may correspond to Block 204 of FIG. 2. Referring to FIG. 14, at Block 1401, one or more photographic filters may be automatically applied to the digital photograph based on processing parameters related to the application. User interaction and or selection may not be necessary, according to some embodiments, to determine which photographic filters to apply to the digital. Automatically applying photographic filters may include suggesting one or more variants to the user, guiding the user with tactile feedback or visual feedback, suggesting variants preferred by a specific contact in the social media application, and applying trending updates over time. The device may automatically determine the photographic filters to apply based on the user profile, the context, communication with contacts, historic communication, trends in communication, previous digital filters applied by the device, statistical trends of the contacts' preferences, weighting of preferences of different contacts, etc. Additional automatically applied photographic filters may include red-eye correction, removal/addition of reflections in the digital photograph, changing lighting, brightness, and/or correction of photographer errors. In some embodiments, the aforementioned filters may be set by the user when taking the photograph, during post-processing operations, or as indicated by the user.

Figure 15:
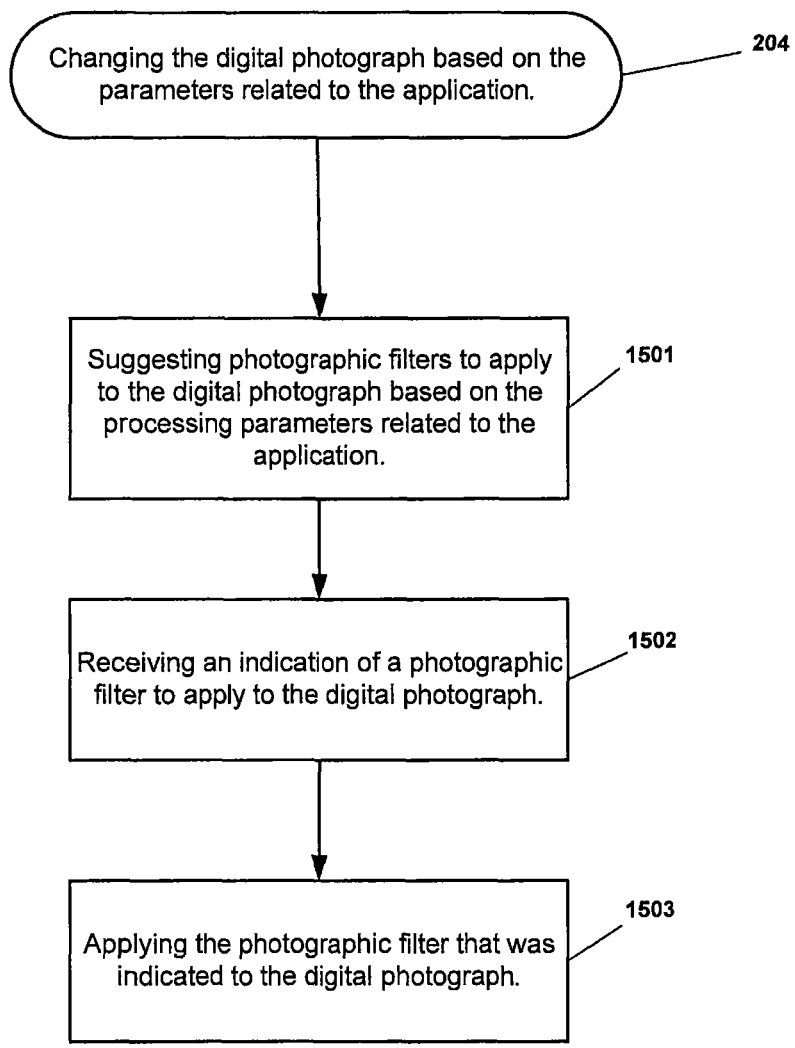
FIG. 15 is a flowchart of operations that may be performed to change the digital photograph by a system, method, device, and/or computer program product, according to various embodiments described herein.

FIG. 15 is a flowchart of operations that may be performed to change the digital photograph, which may correspond to Block 204 of FIG. 2. Referring to FIG. 15, at Block 1501, photographic filters may be suggested to the user based on the processing parameters related to the application. In some embodiments, quality metrics of the digital photograph may be provided to the user. Quality metrics may include an indication of the golden ratio for cropping and/or color harmony. The user may select from the suggested photographic filters and/or based on quality metrics that are presented. The device may receive an indication of a photographic filter to apply to the digital photograph, at Block 1502. The indication may include a selection made the by user at the device by touch, microphone, speech recognition, or any other suitable user interface. At Block 1503, the photographic filter that was indicated may be applied to the digital photograph.

Figure 16:
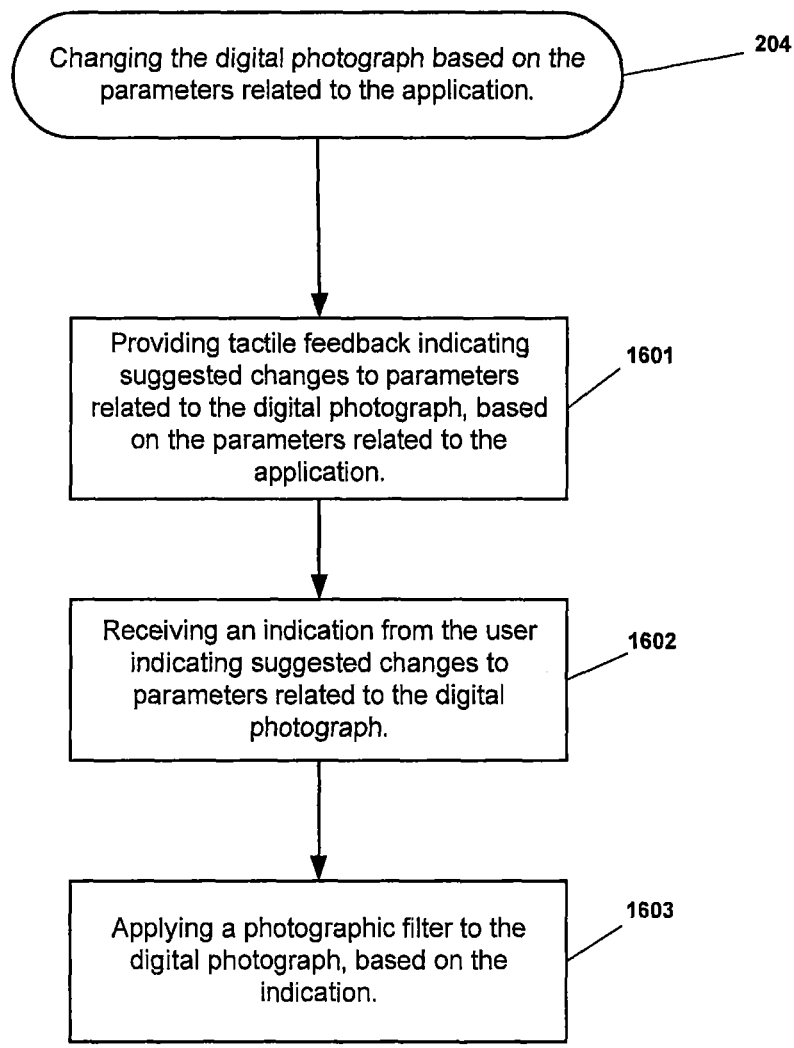
FIG. 16 is a flowchart of operations that may be performed to change the digital photograph by a system, method, device, and/or computer program product, according to various embodiments described herein.

FIG. 16 is a flowchart of operations that may be performed to change the digital photograph, which may correspond to Block 204 of FIG. 2. Referring to FIG. 16, at Block 1601, tactile feedback may be provided that indicates suggested changes to photographic parameters related to the digital photograph. The suggested changes may be based on parameters related to the application. For example, the user may be provided with an indication that one or more of the contacts of the user are using black-and-white, particular focus settings, particular color schemes, and/or other camera settings. The tactile feedback may be based on friction and/or any type of touch surface such as a tesla touch surface. At Block 1602, an indication from the user may be received by the device with suggested changes to parameters related to the digital photograph. Based on the indication, a photographic filter may be applied to the digital photograph, at Block 1603. One or more of the suggested changes to parameters may be applied to the photographic filter.

Additional discussion of various embodiments described herein will be provided. Specifically, various embodiments described herein may arise from a recognition that users often wish to send a photograph in response to a communication. It is desirable to make the photograph relevant to the media in which it is sent or shared. Filters may be applied to make the digital photograph more interesting to viewers or responsive to trends and common ways of presenting the digital photographs. Furthermore, the various embodiments described herein may apply to video, video clips, and/or portions of video content.

In some embodiments, a dynamic relevance engine for processing digital photographs and/or improving digital photographs may be utilized. The dynamic relevance engine may provide functionality according to various embodiments described herein. For example, the dynamic relevance engine may determine trends in social media applications and apply filters based on these trends to digital photographs. The adaptability of the dynamic relevance engine follows from the dynamic nature of trends in general.

Embodiments of the present disclosure were described herein with reference to the accompanying drawings. Other embodiments may take many different forms and should not be construed as limited to the embodiments set forth herein. Like numbers refer to like elements throughout.

It will be understood that, when an element is referred to as being "connected", "coupled", "responsive", or variants thereof to another element, it can be directly connected, coupled, or responsive to the other element or intervening elements that may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the inventive concept. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concept. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit such as a digital processor, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluaRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present inventive concept may be embodied in hardware and/or in software (including firmware, resident software, micro-code, etc.) that runs on a processor such as a digital signal processor, which may collectively be referred to as "circuitry," "a module", a "unit" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

As used herein, the term "mobile device" includes cellular and/or satellite radiotelephone(s) with or without a multi-line display; Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "mobile device" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). As used herein, the term "mobile device" also includes any internet-enabled devices that include functions to access digital photographs.

In the drawings and specification, there have been disclosed embodiments of the inventive concept and, although specific terms are employed, they are used in a generic and descriptive sense only and not for purposes of limitation, the scope of the inventive concept being set forth in the following claims.

The invention claimed is:

1. A method of processing a digital photograph comprising:
  receiving a communication related to the digital photograph from an application external to an image storage device that stores the digital photograph;
  processing parameters related to the application from which the communication was received, wherein the processing parameters related to the application comprises:
    determining one or more photographic filters that are trending on a newsfeed in the social media application; and
    selecting one of the one or more photographic filters that are trending on the newsfeed; and
  changing the digital photograph based on the parameters related to the application,
  wherein changing the digital photograph comprises applying the one of the one or more photographic filters that was selected to the digital photograph, and wherein the application comprises a social media application.

2. The method of claim 1,
wherein the processing parameters related to the application comprises:
determining one or more photographic filters that receive positive feedback in the social media application; and
selecting one of the one or more photographic filters that receive positive feedback; and
wherein changing the digital photograph comprises applying the one of the one or more photographic filters that was selected to the digital photograph.

3. The method of claim 1,
wherein the processing parameters related to the application comprises:
determining one or more photographic filters preferred by one or more contacts from the social media application; and
selecting one of the one or more photographic filters preferred by the one or more contacts; and
wherein changing the digital photograph comprises applying the one of the one or more photographic filters that was selected to the digital photograph.

4. The method of claim 3, wherein selecting the one of the one or more photographic filters comprises:
suggesting the one or more photographic filters preferred by the one or more contacts; and
receiving an indication of a selected photographic filter out of the one or more photographic filters that were suggested to apply to the digital photograph.

5. A method of processing a digital photograph comprising:
receiving a communication related to the digital photograph from an application external to an image storage device that stores the digital photograph;
processing parameters related to the application from which the communication was received, wherein the processing parameters related to the application comprises:
selecting a time window, different from the current time window;
determining a type of photographic filter that is trending on a newsfeed in the social media application in the selected time window; and
indicating the type of photographic filter that is trending in the selected time window; and
changing the digital photograph based on the parameters related to the application, wherein the application comprises a social media application.

6. The method of claim 5,
wherein selecting the time window comprises selecting two or more time windows; and
wherein determining the type of photographic filter comprises determining respective types of photographic filters that are trending on the newsfeed in the social media application in respective ones of the two or more time windows.

7. A device for processing a digital photograph, comprising:
a processor; and
an image processing system that runs on the processor and is configured to perform operations comprising:
receiving a communication related to the digital photograph from an application external to an image storage device that stores the digital photograph;
processing parameters related to the application from which the communication was received; and
changing the digital photograph based on the parameters related to the application,
wherein the processing parameters related to the application comprises:
determining one or more photographic filters that are trending on a newsfeed in the social media application; and
selecting one of the one or more photographic filters that are trending on the newsfeed; and
wherein changing the digital photograph comprises applying the one of the one or more photographic filters that was selected to the digital photograph.

8. The device of claim 7,
wherein the processing parameters related to the application comprises:
determining one or more photographic filters that receive positive feedback in the social media application; and
selecting one of the one or more photographic filters that that receive positive feedback; and
wherein changing the digital photograph comprises applying the one of the one or more photographic filters that was selected to the digital photograph.

9. The device of claim 7,
wherein the processing parameters related to the application comprises:
determining one or more photographic filters preferred by one or more contacts from the social media application; and
selecting one of the one or more photographic filters preferred by the one or more contacts; and
wherein changing the digital photograph comprises applying the one of the one or more photographic filters that was selected to the digital photograph.

10. The device of claim 9, wherein selecting the one of the one or more photographic filters comprises:
suggesting the one or more photographic filters preferred by the one or more contacts; and
receiving an indication of a selected photographic filter out of the one or more photographic filters that were suggested to apply to the digital photograph.

* * * * *

UNITED STATES PATENT AND TRADEMARK OFFICE
CERTIFICATE OF CORRECTION

PATENT NO. : 9,646,360 B2
APPLICATION NO. : 14/441567
DATED : May 9, 2017
INVENTOR(S) : Isberg et al.

Page 1 of 1

It is certified that error appears in the above-identified patent and that said Letters Patent is hereby corrected as shown below:

In the Claims

Column 13, Claim 2, Line 9: delete "that receive positive" and insert -- receive positive --

Signed and Sealed this
Thirteenth Day of March, 2018

Andrei Iancu
*Director of the United States Patent and Trademark Office*